United States Patent [19]
Hawkins

[11] 3,971,967
[45] July 27, 1976

[54] FLUORESCENT LAMP INSTALLATION HAVING SEPARATE FILAMENT TRANSFORMERS AND REMOTELY LOCATED BALLAST

[75] Inventor: Henry H. Hawkins, West Vancouver, Canada

[73] Assignee: H. H. Hawkins Ltd., W. Vancouver, Canada

[22] Filed: Jan. 16, 1975

[21] Appl. No.: 541,685

[30] Foreign Application Priority Data
May 17, 1974 Canada .............................. 200238

[52] U.S. Cl. ........................ 315/97; 240/51.11 R; 240/67; 315/98; 315/105; 315/DIG. 5
[51] Int. Cl.² .................... F21V 21/14; H05B 41/14
[58] Field of Search .......................... 315/94–100, 315/102–107, DIG. 5; 240/51.11 R, 67, 69; 47/17

[56] References Cited
UNITED STATES PATENTS

| | | |
|---|---|---|
| 2,683,241 | 7/1954 | Passmore .............................. 315/97 |
| 2,866,133 | 12/1958 | Strange et al. ..................... 315/96 X |
| 3,108,399 | 10/1963 | Fraser .......................... 240/51.11 R |
| 3,315,123 | 4/1967 | Furui ................................. 315/100 |
| 3,582,709 | 6/1971 | Furui et al. ............................ 315/96 |

FOREIGN PATENTS OR APPLICATIONS
960,912   3/1957   Germany ...................... 315/DIG. 5

Primary Examiner—Siegfried H. Grimm
Attorney, Agent, or Firm—Beveridge, DeGrandi, Kline & Lunsford

[57] ABSTRACT

A fluorescent lamp installation for very high intensity illumination uses standard rapid start filament type lamps with standard ballast remote from the lamp pairs to reduce cooling requirements. The heavy wiring harnesses previously required of six leads between each ballast and a lamp pair are reduced to one with a common lead for all the lamp pairs.

10 Claims, 4 Drawing Figures

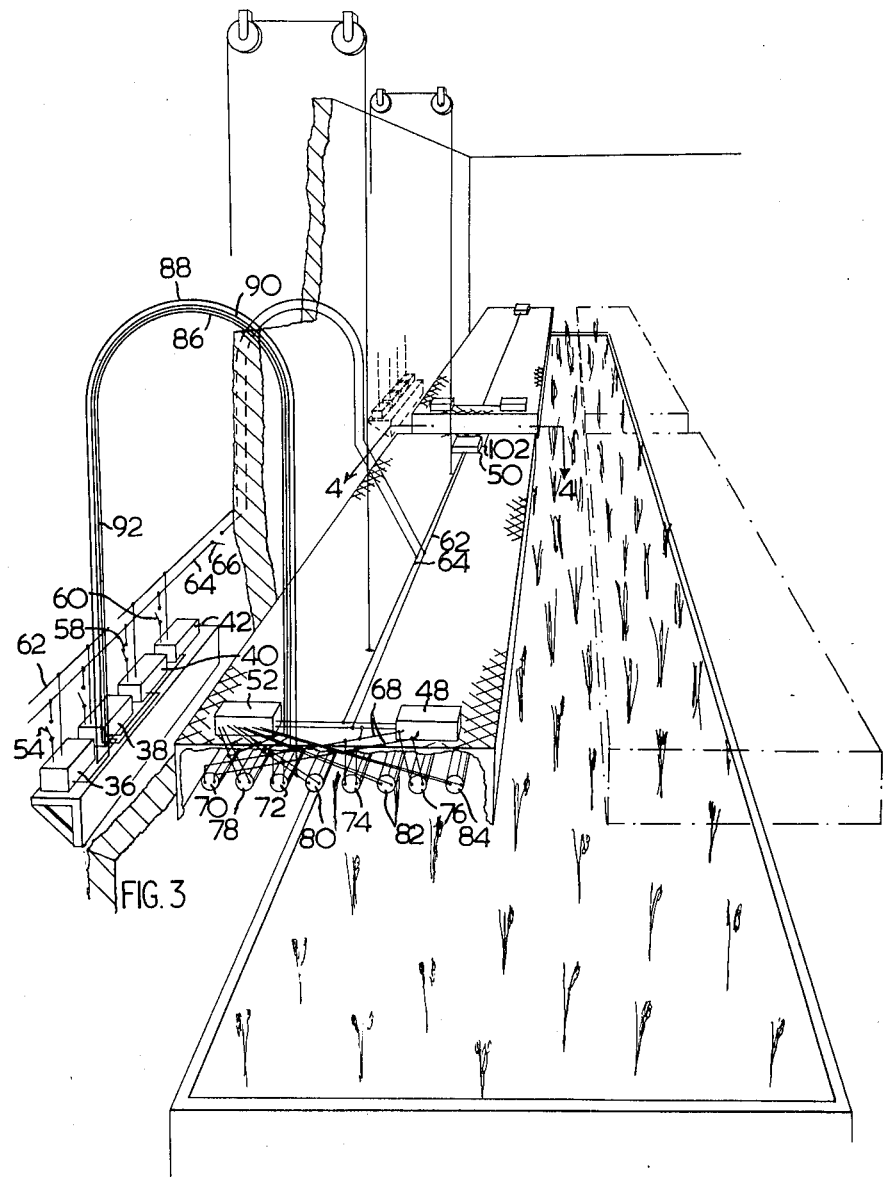

FLUORESCENT LAMP INSTALLATION HAVING SEPARATE FILAMENT TRANSFORMERS AND REMOTELY LOCATED BALLAST

Introduction

This invention relates to fluorescent lamps and the circuits and ancillary apparatus necessary for their operation, particularly ballast circuitry.

Background

The luminous efficiency of fluorescent lamps is well known as are the various methods of overcoming the instability of the gaseous discharge by an electrical ballast. In a typical commercially available fixture two leads from the supply are connected to a device which is termed a "ballast" although it is also a power factor correcting circuit and a filament transformer; six wires connect the ballast to the two lamps to achieve various functions as will be understood. The ballast is usually mounted in the elongated pressed steel channel necessary to hold the lamp holder end connections reasonably rigid. A cover and ends convert the channel into an elongated box which hides the ballast.

This type of installation is entirely satisfactory for fixed lamps, and where lighting levels are those of a well lighted office, for instance two forty watt lamps in a five foot square ceiling module. Problems arise when such commercially available installations are used for much higher lighting intensity or when much height adjustment is required.

A specific example of an installation where this problem is most evident is in the modern plant nursery and where high intensity light sources are used to stimulate plant growth in chambers where the environment is controlled. The lamp canopies mount lamps as close together as possible so that a typical spacing for 1½ inch diameter fluorescent tubes is 1 ⅝ inch, leaving only ⅛ inch spacing for cooling air.

Because of the heat generated by the iron and copper losses in the ballasts, they are usually mounted, in such nurseries, and environmental chambers, remote from the lamp canopy; they are connected to the lamps by a multiwire cable. The heating problem is accentuated in practice by extraneous factors which do not have a direct bearing on the invention; for instance, it is usual to intersperse canopies with rows of incandescent lamps to simulate the spectrum of the sun more closely, that is to add enough light of red wave lengths which are deficient in fluorescent lamps.

These multiwire cables add considerably to the costs in time and material for manufacture and particularly so as the low filament supplies (3.5 volts at 1½ amps) demand large gauge copper. Moreover, they are highly objectionable because it is usually desirable to adjust the height of the canopy as the plants grow. The height adjustment requires longer multiwire cables -sometimes to 40 feet and longer; after the cable has been lengthened further expense is needed to increase the counterbalance weight for easy height adjustment. Despite these disadvantages what has been described above is conventional practice.

SUMMARY OF THE INVENTION

It is an object of the invention to reduce the numbers of wires from each ballast to ultimately one per pair of lamps in a canopy plus a common lead. The invention itself comprises a fluorescent lamp installation comprising a plurality of pairs of discharge lamps each lamp having a pair of filaments, a plurality of current limiting ballasts located remote from said lamps; means for connecting one side of each ballast to a source of supply; means connecting the other side of each ballast to one filament of one of a pair of lamps with no more than one lead per pair of lamps; means for connecting the other side of said supply to one filament of the other lamp of said pairs; means to supply current to the filaments of each pair of lamps so that the other filaments of said one and said other lamp in the pair are connected together and said one filament of each lamp in the pair are isolated from each other, wherein said lamp filament current supply means is mounted close to said lamps.

The invention will be more clearly understood after a review of the drawings which illustrate by way of example an installation embodying the invention and the circuit connections for such an installation compared with conventional circuitry.

BRIEF DESCRIPTION OF THE DRAWINGS

In the Drawings:

FIG. 3 is a perspective view of an installation of the circuit of FIG. 2 with a canopy end removed to show a semi-diagrammatic representation of the wiring leads.

Figure 1:
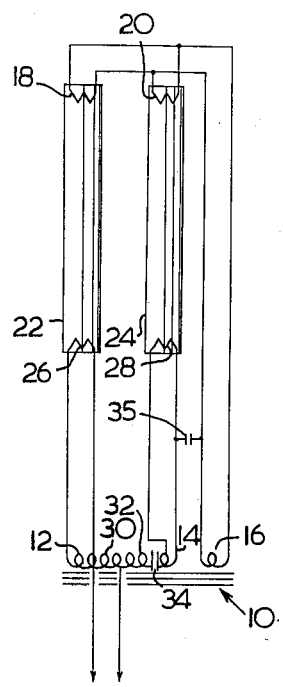
FIG. 1 illustrates a prior art ballast circuit for lighting a pair of fluorescent lamps.
Figure 4:
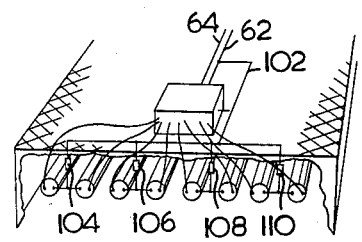
FIG. 4 is a scrap view showing a semi-diagrammatic representation of the wiring leads at the other end of the canopy.

Multiple lamp canopies for high intensity lighting have heretofore used essentially the circuit of FIG. 1 which is the standard commerical ballast and merely elongated the leads therefrom if the ballast gave rise to problems due to heating or weight. The standard ballast 10 comprises three filament transformer windings 12, 14, 16. The two filaments 18, 20 at one end of a pair of lamps 22, 24 are connected in parallel and heated by winding 16 and the leads are color-coded yellow. Transformer windings 12 and 14 with leads color coded blue and red, respectively, heat the filaments 26, 28 at the other end of lamps 22, 24.

The ballast is thus an auto-transformer whose primary winding 30 is in series with the ballast winding 32 which serves the double function of generating a high initial voltage for striking the discharge and limiting the current once the discharge has been established: this circuit, known as a "rapid-start" circuit, used with suitable lamps is entirely conventional and has been in use for about 20 years. The capacitor 34 for power factor correction is also well known.

The filaments are usually left on because they take so little power (typically 3.5 volts and 1.5 amps) that it is uneconomic to provide a switch with its failure rate, when considerably more watts are being lost in the ballasting action.

The high voltage is applied across the two lamps in series, because it is applied across filaments 26, 28, filaments 18 and 20 being connected together. Typically a pair of 96" VHO lamps are limited by the ballast to 1500 ma at the rated on load voltage of 375 volts at continuous operation although the no load or arc striking voltage is 550 v.

Unfortunately this circuit although by far the most popular for normal home, office or manufacturing plant light suffers from severe disadvantages when it is desired to move the ballast away from the lamps. A four pair lamp canopy demands twenty four feet of wiring for every foot the ballasts are moved away from the canopy.

Figure 2:
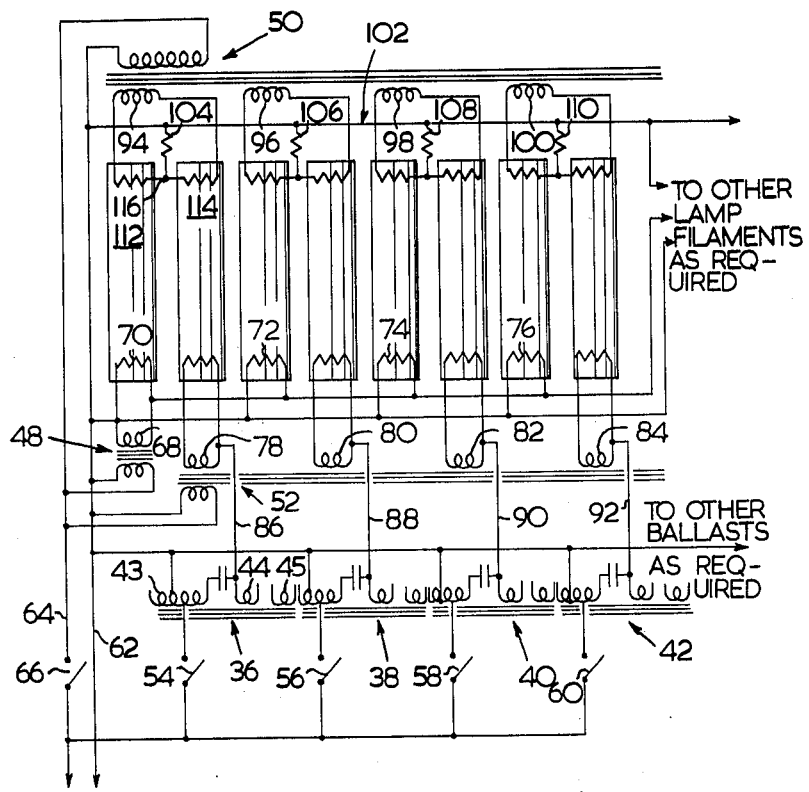
FIG. 2 is a circuit diagram for lighting several pairs of lamps in which the number of wires from the ballasts is one more than the numbers of pairs of lamps.

FIG. 2 shows a supply circuit for such a canopy in which the wires from the ballast have been reduced to one per pair of lamps and a common lead, which also feeds filament transformers.

Standard ballasts 36, 38, 40, 42, have been shown, because it has been found economic to use such ballasts leaving the filament windings typically 43, 44 and 45 unused. Instead the filaments are supplied by three separate small filament transformers 48, 50, 52 mounted on the canopy close to the filaments. As mentioned above, these transformers require only about 5 watts per filament and so are much lighter than the ballast. As will be explained below they are not continuously rated, and for this reason corresponding transformers are appreciably lighter than that portion of the standard ballast which supplies filament current for a pair of lamps. Moreover, the supply to the transformers is at line voltage so that small gauge wire can be used in the long leads, and a single pair of leads feeds all filament transformer primaries.

From FIGS. 2 and 3, it can be seen that transformer 48, supplying filaments at the common end of the separate high voltage circuits can have a single secondary supplying four filaments or as many as needed but that separate isolated secondaries are needed (for transformer 52) to provide separate ballast circuits. Thus, as shown, switches 54, 56, 58 and 60 are provided because it is highly desirable, in plant science practice, to simulate sunrise and sunset by switching the lamps in canopy on and off in steps. This is usually done in practice by time clocks controlling groups of lights but manually operated switches have been illustrated in FIG. 3 for the sake of clarity.

The filament transformers 48, 50, 52 are mounted on the lamp canopy near the filaments they supply and are fed by primary leads 62, 64, the latter having a switch 66; in practice this switch 66 is fully automated as a time delay thereby requiring no attention.

Although a filament transformer 48 has been shown with a single secondary 68 supplying filaments 70, 72, 74, 76 it will be understood that the transformer itself can, if desired, be physicaly identical to transformer 52 with mulitple secondaries 78, 80, 82, 84. Each of these secondaries of transformer 52 supplies one filament and is electrically isolated from its fellows as it has a different high voltage supply — transformer — ballast 36, 38, 40 or 42 through leads 86, 88, 90 and 92.

Filament transformer 50 also has isolated secondaries 94, 96, 98, 100 and each winding supplies two filaments. The electrical isolation is necessary because each is connected, as it were, to a point half way along the discharge from the separate high voltage supplies from ballasts 36, 38, 40 and 42. The common connections to lead 62 through lead 102 is illusory because resistors 104, 106, 108 and 110 of 50,000 ohms each have such a large voltage drop across their terminals that they do not affect the relative voltage of the separate common points between two adjacent tubes.

These resistors — rated at 2 watts — serve as external grids to each pair of lamps to assure consistent lighting under all ambient and temperature conditions. When the lamps are very warm there is sometimes a hesitation when they are turned off and on again. The external grids also assist starting under unusually low line voltage conditions 100 volts instead of 120. It will be understood that the actual resistance value is not critical; —the voltage across the resistor — about half the load voltage supplied by the ballast (say 150 volts) will result in a current of 3 milliamps which is quite negligible compared with the 1500 milliamps drawn by the lamps. However, the loss becomes appreciable if the resistance becomes too small.

To start the lamps, switch 66 is first switched on supplying current to filament transformers 48, 50 and 52. If switch 54 is closed at the same time the first pair of lamps will light up within about 1 second or so, just as in a normal "rapid-start" lamp circuit. This occurs under a wide range of ambient temperatures because of the grid resistor 96.

While this part of the invention is not dependent upon the following explanation, it is believed that the manner of operation of the grid circuit is that normally the ballast open circuit voltage of 550 volts is distributed evenly between two adjacent lamps, say, lamps 112, 114. Now, 275 volts may not be sufficient to start the discharge properly under certain circumstances, but if no current is flowing through the lamps, the two ends of resistor 104 are at virtually the same potential. Thus, virtually the full 500 volts appears across junction 116 and lead 86 connected to ballast 36, i.e. across only lamp 114 of the pair. Thus, to this lamp virtually no load voltage is applied with virtually zero volts appearing across lamp 112. Lamp 114 lights and its resistance drops rapidly and normal starting voltage is applied to its fellow, lamp 112 which also lights and operation thereafter is normal. All this occurs in a fraction of a second.

As mentioned, switches 56, 58 and 60 are closed one by one or in groups by time clocks to simulate light increase at sunrise and when the last pair of lamps has been lit, switch 66 is opened. Of course, it is well known that such lamps will operate without filament current once the discharge has been properly started but the provision of the independent filament switch results in not only the expected longer lamp life but also no heat dissipation by both transformer and filament during full operation; this is a worthwhile saving. More follows: the transformers need not be continuously rated and so they can be smaller and lighter. It will be understood that the heat loss adds to the air conditioning load required - incandescent lamps mentioned for spectrum correction would raise the temperature too much without some air circulation and cooling.

The lamps may, of course, be switched off two by two, without re-energizing the filament transformers until it is time for the next "sunrise".

As a specific example, each of the six lead wires in FIG. 1 required, according to data published by a lamp manufacturer, 12 gauge wire for 50 foot long leads. In this system not only are the high voltage leads reduced to one per lamp plus a common, but also the gauge can be reduced to 18 gauge. The leads to the filament transformers will add little to the cost. A mechanical ground lead is also required as is known in practice.

While there has been shown and described what is at present considered the preferred embodiment of the invention, it will be obvious to those skilled in the art that various changes and modifications may be made therein without departing from the invention as defined by the appended claims.

The embodiments of the invention in which an exclusive property or privilege is claimed are defined as follows:

1. A fluorescent lamp installation comprising:
    a plurality of pairs of discharge lamps each lamp having a pair of filaments;
    a plurality of current limiting ballasts located remote from said lamps;
    means for connecting one side of each ballast to a source of supply;
    means connecting the other side of each ballast to one filament of one of a pair of lamps with no more than one lead per pair of lamps;
    means for connecting the other side of said supply to one filament of the other lamp of said pair;
    means to supply current to the filaments of each pair of lamps so that the other filaments of said one and said other lamp in the pair are connected together and said one filament of each lamp in the pair are isolated from each other, wherein said lamp filament current supply means is mounted close to said lamps.

2. A fluorescent lamp installation as claimed in claim 1 wherein said ballasts are standard rapid start ballasts.

3. A fluorescent lamps installation as claimed in claim 1 wherein the pairs of lamps are mounted in a canopy, and wherein the means to supply current to the lamp filaments comprise a transformer means mounted on said canopy, and means connecting the transformer means to a power source.

4. A fluorescent lamp installation as claimed in claim 1 wherein the lamps are mounted in a canopy and wherein the means to supply current to the other filaments of said one and said other lamp comprise a transformer mounted on the canopy near one end of the lamps, and means to supply current to said one filament of said one lamp comprises a second transformer and the means to supply current to said one filament of said other lamp comprises a third transformer, said second and said third transformers being mounted near the other end of said lamps.

5. A lamp installation as claimed in claim 1 further comprising high resistance means connecting said other filaments of said one and said other lamps to said other side of said supply.

6. A lamp installation as claimed in claim 1 and further comprising a light canopy, means for mounting the lamps under the light canopy, and means for raising and lowering the light canopy.

7. A lamp installation as claimed in claim 1 having a single pair of leads connected near said lamps to a plurality of said means to supply current to the filaments of each pair of lamps.

8. A lamp installation as claimed in claim 7 wherein one of said leads is connected near the lamps to said one filament of said other lamp.

9. A fluorescent lamp installation comprising:
    a plurality of current limiting ballasts;
    a movable assembly which is remote from and movable relative to the ballasts, said movable assembly including a plurality of pairs of discharge lamps each lamp having a pair of filaments;
    means for connecting one side of each ballast to one side of a source of supply;
    means connecting the other side of each ballast to a first filament of one said pair of lamps;
    a plurality of lamp filament current supply means located on said movable assembly, each said current supply means supplying current to the filaments of each pair of lamps so that second and third said filaments of each pair of lamps are connected together and said first filaments of different pairs of lamps are isolated from each other;
    a single pair of leads leading from said source of supply to and connected on said movable assembly to a plurality of said lamp filament current supply means;
    means on the movable assembly for connecting said lead which is connected to the other side of said supply from said ballasts to a fourth filament of a said pair of lamps.

10. A lamp installation as claimed in claim 9 wherein each lamp filament current supply means includes transformer means with a plurality of secondary windings connected to said filaments.

* * * * *